United States Patent [19]
Moore

[11] 4,090,577
[45] May 23, 1978

[54] SOLAR CELLED HYBRID VEHICLE

[76] Inventor: Wallace H. Moore, 283 Argonne Ave., Long Beach, Calif. 90803

[21] Appl. No.: 788,623

[22] Filed: Apr. 18, 1977

[51] Int. Cl.² .................. B60L 11/18; B60L 15/02; B60K 9/00
[52] U.S. Cl. .................. 180/44 M; 105/50; 180/60; 180/65 R; 318/139
[58] Field of Search ............. 180/65 R, 65 B, 65 C, 180/65 E, 65 F, 65 A, 44 M, 44 E, 57, 60, 54 C; 318/139; 290/4 C; 105/50, 51, 49

[56] References Cited

U.S. PATENT DOCUMENTS

| 937,859 | 10/1909 | Pieper | 180/44 M |
|---|---|---|---|
| 1,059,562 | 4/1913 | Pfouts | 180/57 |
| 1,474,942 | 11/1923 | Probst | 318/139 |
| 3,219,137 | 11/1965 | Appleton | 180/65 R X |
| 3,241,019 | 3/1966 | Gross | 180/65 R X |
| 3,444,946 | 5/1969 | Waterbury | 180/65 R |
| 3,451,469 | 6/1969 | Hall et al. | 180/65 R X |
| 3,502,165 | 3/1970 | Matsukata | 180/65 A |
| 3,927,728 | 12/1975 | Reime | 180/60 |
| 3,971,454 | 7/1976 | Waterbury | 180/65 R |
| 4,042,056 | 8/1977 | Horwinski | 180/65 A |

Primary Examiner—Joseph F. Peters, Jr.
Assistant Examiner—Milton L. Smith
Attorney, Agent, or Firm—William C. Babcock

[57] ABSTRACT

A front wheel driven, gas powered vehicle is converted to include a rear differential connected for power input to a first and second electrical motor, or a single electric motor if desired. When first and second electrical motors are used they are connected in parallel, the power input thereto being brought across a current limiting series of resistors to protect and control the current level thereto. A switching circuit connects in various series and parallel combinations a plurality of batteries and concurrently switches the necessary current limiting resistance. Thus a control combination is provided including a manual selector for the desired forward and reverse directions and the low and high current ranges which is further multiplied by the various resistances. In this configuration, the normally available gasoline power plant is retained in the vehicle and is augmented during periods of nonoptimal use by the above electric motor provisions. This electric power can be periodically replenished either by way of a charger or a set of solar panels placed on the roof of the vehicle.

5 Claims, 6 Drawing Figures

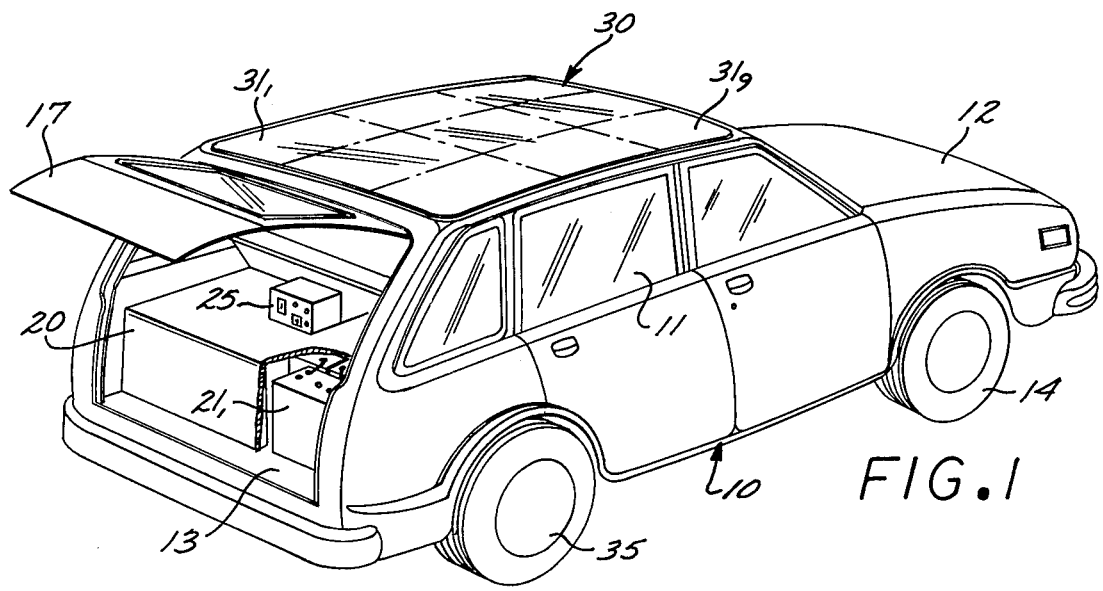

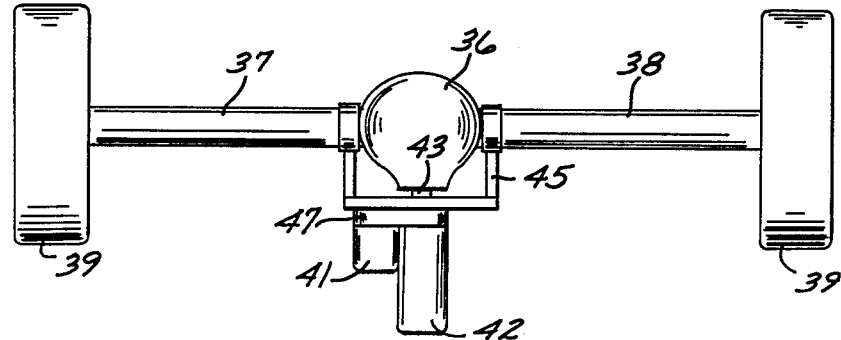
FIG.5
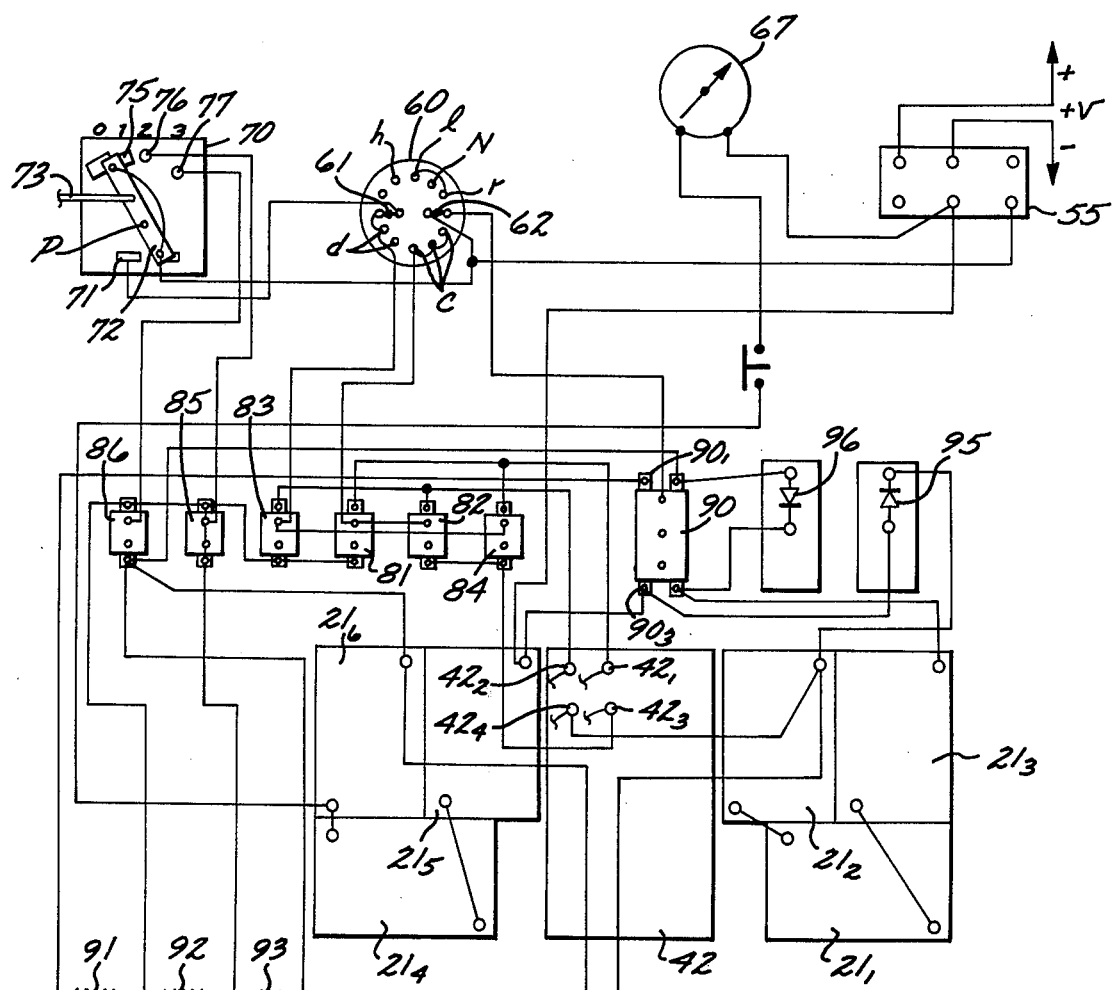
FIG.6
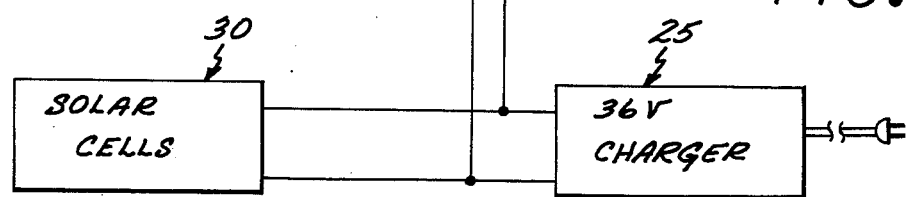

SOLAR CELLED HYBRID VEHICLE

BACKGROUND OF THE INVENTION

1. Field of the Invention

The present invention relates to automotive vehicles, and more particularly to a hybrid vehicle including both electric and gasoline powered propulsion means.

2. Description of the Prior Art

As improvements occur in the packaging and power density of gasoline engines, the trend is to reduce the size thereof in favor of or in exchange for passenger space. One of the more optimal recent trends is the common packaging of the power plant, the differential and transmission as a single unit which typically results either in a rear engine, rear drive or front engine, front drive configuration. In either instance, the front or rear axle is therefore wholly unpowered and furthermore the weight balance, particularly where a substantially large greenhouse or passenger compartment is provided, is often heavily biased in favor of the powered axle. To alleviate this weight bias, various suspension improvements are often utilized with the attendant increase in cost and sophistication of the vehicle.

Even in its most optimal configuration, a gasoline engine typically operates at a highly non-linear fuel use curve and is particularly demanding in gasoline consumption during periods of acceleration such as those entailed in the stop and go traffic of a typical urban street system. Concurrent with this trend in gas powered vehicles there has been a recent effort in employing electric drives for use in transportation. The advantages of an electric motor are particularly suited for the varying load conditions experienced in urban use. The weight of a battery system, however, precludes efficient use of electric drive over extended distances. Accordingly, a hybrid combination of an electric and gas drive best achieves the varying demands imposed on the vehicle. It is the combination thereof and the recharging features that have been the most problematic aspects of the prior efforts.

SUMMARY OF THE INVENTION

Accordingly, it is the general purpose and object of the present invention to provide an electrically powered axle in substitution for the usually unpowered front or rear axle of a conventional automobile.

Other objects of the invention are to provide an alternate source of motive power to an automobile which during the use of the primary source may be recharged by way of solar panels.

Yet further objects of the invention are to provide a multiposition switch which selectively engages corresponding solenoids to variously connect batteries to the electrical motor.

Yet further objects of the invention are to provide an electric drive for an automotive vehicle wherein the level of power applied to the motor is determined by a combination of a selector switch position and the position of the accelerator pedal.

Yet additional objects of the present invention are to provide an electrically powered axle system in substitution for the unpowered axle of a gas powered automobile.

Yet additional objects of the present invention are to provide an electric power supplement which is conveniently installed, easy to maintain and inexpensive in production.

Briefly these and other objects are accomplished in the present invention by installing in a single axle driven automotive vehicle a differentially geared second driving axle, the differential drive input being connected by way of chain and sprocket to a first and second electrical motor. The first and second motors are connected in parallel to a solenoid switching bank which includes two solenoid stages connected for selection to a manual selector switch and a multiposition switch articulated by the deflection of the accelerator pedal. One of the two solenoid stages selects or switches in or out of the motor circuit a plurality of resistors which, according to the series combination thereof, determines the current levels applied and the other stages alter the voltage interconnection between a plurality of batteries. In this form the gas pedal, usually used to select the mixture ratio to the engine, is utilized to select the current levels to the motors while the voltage level is determined by a selector switch approximating the function of the selector bar of a typical automatic transmission.

In order to achieve a fully contained facility, the foregoing implementation further includes a charging device which is connected across the series connection of batteries to thus concurrently charge all batteries from a conventional A.C. output. Alternatively and in supplementation to the above charger, the upper surface of the vehicle is modified to include a plurality of solar cells which, once more, are connected across the series circuit of batteries. In this manner, during the periods when the gasoline engine is used as the mode of propulsion for the vehicle, the solar cells provide a supplemental charge. Since the use of the gasoline engine is most optimal at highway conditions, this long range, high efficiency mode of power complements the relatively low amperage levels achievable from the solar panels. In the eventuality where the automobile thus modified is used in a predominantly electric power state the normal facilities of the charger periodically bring the batteries up for further use.

BRIEF DESCRIPTION OF THE DRAWINGS

FIG. 1 is a perspective illustration of a conventional, front wheel driven, front engine vehicle modified in part according to the invention herein;

FIG. 2 is a solar panel layout useful in deploying solar panels on the upper surface of the vehicle shown in FIG. 1;

FIG. 3 is a detail side view of a differential adapted for use with the invention herein;

FIG. 4 is an illustration of an instrument and control layout useful with the invention herein;

FIG. 5 is a rear axle including a differential connected for power to an electrical motor, the rear axle being useful in substitution for the normally passive axle in the vehicle shown in FIG. 1; and FIG. 6 is a circuit schematic illustrating the control interconnection useful with the invention herein.

DESCRIPTION OF THE SPECIFIC EMBODIMENT

While the following description makes particular references to a front engine, front drive, automobile as the vehicle modified herein, such is examplary only. It is to be understood that various other automobile configurations may be similarly implemented and no intent to limit the scope of the present invention by this choice of example is expressed.

As shown in FIG. 1 a passenger vehicle generally designated by the numeral 10, in its most revalent form, includes a greenhouse or passenger compartment 11 disposed between an engine housing 12 and a cargo compartment 13. In the more recent configurations in the prior art, the vehicle 10 is most often powered or driven by front wheels 14, a typical example of a configuration of this type being a 1976 Honda station wagon model. In this form the high density of the engine contained in the engine compartment 12 and the immediately adjacent differential and transmission connected to wheels 14, provide an inordinate forward weight bias, particularly in cases where the rear seats of the passenger compartment are unoccupied. While conventionally this weight bias is accomodated by sophisticated suspension arrangements, these same arrangements are designed to handle large cargo loads and therefore may be modified to convert this prior art vehicle to a hybrid drive.

More specifically, shown disposed in the cargo compartment 13, and accessible through a cargo door 17, is an electric drive enclosure 20 storing a plurality of batteries $21_1$–$21_6$ and supporting a charger 25 which may be connected to any conventional home outlet to periodically bring the batteries up to full charge. Included further on the upper surface or roof of the vehicle 10 is an array of solar cells generally designated by the numeral 30 comprising nine rectangular array segments $31_1$–$31_9$ such as those produced by Sensor Technology of Chatsworth, California, each solar panel $31_1$–$31_9$ including a plurality of silicon wafers 32 shown in plan view in FIG. 2. This combination of the silicon wafers provides approximately 100 watts of electric power when exposed to full radiation from the sun. It is the power supplied by way of batteries $21_1$–$21_6$ which is utilized to drive a rear axle 35 modified according to the illustrations set out in FIGS. 3 and 5.

As shown in FIG. 5, axle 35 comprises a differential housing 36 enclosing a conventional set of differential gears (not shown) which through two axle tubes 37 and 38 apply the motive power to the rear wheels 39. This power, in turn, is developed by way of two electric motors 41 and 42 which, through a chain drive to be described, apply power to a propeller input shaft 43 on the front end of the differential housing 36. As shown in FIGS. 3 and 5, electric motors 41 and 42 are flange mounted to a bracket 45 extending across the front of the differential housing 36, bracket 45 including an opening 46 therein for the passage of the propeller shaft 43 therethrough. It is intended to provide two chain drives 48 and 49 on the end of the shaft 43, each chain drive respectively engaging a corresponding output of motors 41 and 42. In FIG. 5 this same chain sprocket configuration is shown enclosed by way of a chain housing 47 providing the enclosure therefor immediately adjacent the bracket 45.

As shown further in FIG. 3 the configuration of motors 41 and 42 and particularly the disposition of bracket 45 are such that motor 42, at least partially, extends into the interior of the cargo compartment 13. It is intended to provide a conforming cut out 51 in the floor of the cargo compartment 14 for this purpose. In this manner the heat losses normally occurring in any electric motor are utilized to best advantage by concurrently increasing the temperatures inside the enclosure 20 to thus raise the environmental temperature of batteries $21_1$–$21_6$ for improving the electrochemical process occurring therein.

It is intended to install an axle 35 thus configured in place of the normally unpowered rear axle in a vehicle of this kind, the vehicle being further modified to provide the requisite opening 51 both for clearance and for the necessary thermal interchange with the batteries.

As shown in FIGS. 4 and 6, the substitution of the powered axle 35 in exchange for the usually unpowered axle further entails the necessary electrical controls by which the varying drive demands are accommodated. More specifically, shown in FIG. 4 is a control panel comprising a three position selector switch 55 by way of which the selection between gas and electric power is made. To illustrate this selection, the switch is labeled by the Letters G and E at the respective extremes thereof, there being a center position labeled "off" at which neither power option is selected. Shown adjacent switch 55 is a multi-position switch 60, manually articulated between four positions respectively labeled R, N, L, and H, and duplicating the selector stick of an automatic transmissiion. Disposed above the control switches 55 and 60 is a battery state indicator 65 comprising a push-to-close switch 66 and a meter 67.

As shown in FIG. 6 switch 60 is conformed in a manner of a rotary two pole six throw switch having two selector contacts 61 and 62 articulated in rotation to select, in pairs, any two opposed terminals out of 12 terminals around the periphery thereof. Comprising a part of the selector positions and disposed on the upper half of switch 60 are a plurality of terminals respectively labeled $h$, $l$, $n$ and $r$ to correspond with the above described switching positions H, L, N and R. It is these switch terminals, $h$, $l$, $n$ and $r$ that are selected by contact 61, contact 62 concurrently selecting the terminals disposed on the opposing half of the switch. In the configurations shown, terminals $l$ and $r$ are connected together to provide the necessary high voltage input corresponding to the reverse and the low gearing of an automatic transmission. The selection of terminals $h$ and $l$ by contact 61, is concurrent with the selection of a set of terminals commonly connected and designated by the other contact 62.

Contact 61, furthermore, is connected to a first terminal 71 of a control switch 70 connected for mechanical actuation by the gas pedal in the automobile. More specifically, control switch 70 includes a contact bar 72 articulated by a rod 73 around a pivot P to pivotally translate thereabout according to the depression of the pedal. As the contact bar is articulated, a plurality of terminals 75, 76 and 77 are sequentially selected by the upper end thereof. During the selection of terminals 76 and 77, the lower end of contact bar 72 engages a terminal 71. For the purposes herein, the contact bar may be either a solid conductor or a non-conducting element having both contact ends thereof connected in common. By virtue of this arrangement the articulation of the bar 72 is making contact with terminals 76 and 77, maintaining these terminals at the same potential as terminal 71 and therefore at the potential of contact 61.

Contact 62, in turn, is directly connected to the hot side of switch 55 when it is thrown to the electric or "E" position. Thus, as contact 62 translates and selects the above-described contacts terminals C in switch 60, contact 61 engages either the high or low terminals H and L. Terminals C, in turn, are connected to energize in parallel two single pole double throw relays 81 and 82, the function of which is to be further described hereinbelow. In the neutral $n$ or reverse $r$ switch position, contact 62 selects either one of two terminals commonly designated as terminals D which, again, energize in parallel yet another two relays 83 and 84. In addition to the above control input, the control switch 70 by way of connections from terminals 76 and 77 selectively energizes corresponding relays 85 and 86.

The control modes thus provided combine two switch inputs, one of which being dependent on the depression of the gas pedal and the other one being determined by manual alignment. According to this control the input terminal of relay 86 is connected to the positive end of battery $21_6$ which is series connected with batteries $21_5$ and $21_4$. This same terminal of relay 86 also connects to a series resistance circuit comprising high wattage resistors 91, 92 and 93. The juncture between resistors 92 and 93, in turn, connects to the input terminal of relay 85 while the juncture between resistors 91 and 92 connects to the output of relays 85 and 86. The series connection is completed by way of a circuit return from resistor 91 to one input terminal $90_1$ of a double pole/double throw relay 90.

Thus, as the control bar 72 is advanced to contact terminal 77, relay 86 is closed shorting out resistors 92 and 93. As the pedal pressure is reduced terminal 76 is then excited opening relay 86 and closing relay 85. Resistor 92 is then shorted out leaving resistors 91 and 93 in the circuit. Finally as the bar 72 is relaxed to contact the open terminal 76 both relays 85 and 86 are open and the full series load is applied. This series load, once more, is between the output or plus end of battery $21_6$ and the output terminal of relay 85. This same output is connected in common to the inputs of relays 81 and 83 which are in turn controlled by terminals c and d of switch 60. Thus as the contact 62, rendered hot by switch 55, is contacting the c or d terminals, relays 81 and 83 are correspondingly closed. The output of relay 81 then excites one terminal $42_1$ of motor 42.

Alternatively, when contact 62 is on terminals d, relay 83 is closed to excite a terminal $42_2$ on motor 42. Relays 82 and 84 are closed in parallel with relays 81 and 83, the inputs of relays 82 and 84 being tied in common to a terminal $42_3$ of motor 42, the other terminal of relay 82 being tied to relay 83 and terminal $42_2$. Similarly the output terminal of relay 84 is tied to relay 81 and terminal $42_1$. Thus, when relay 83 is closed, terminals $42_2$ and $42_3$ are at the same potential. Alternatively, when relay 81 is closed terminals $42_1$ and $42_3$ are at the same potential. The fourth terminnal $42_4$ of motor 42 is tied to the negative end of battery $21_2$ which again is in series with batteries $21_1$ and $21_3$. This same battery terminal is tied to the cathode of a diode 95 which at its anode connects to a terminal $90_3$ of the reversing relay 90. Yet another diode 96 is tied in forward bias across terminals $90_2$ and $90_4$ of the same reversing relay. It is this relay that is connected for control to terminal r of switch 60 and will switch over upon contact with contact 61. In this mode contact 62 is on terminals D which according to the state of relays 81 and 83 provides a full six battery potential to the motor. This same full potential is available in the other state of contact with terminal d at which time the l terminal is excited.

When the h terminal is excited the batteries are connected in parallel for maximum ampere rating and in the n state the terminal selected by contact 62 is open this rendering all relays 81–84 open. In this last state the battery circuit is completed across diode 95 providing full battery stacking while no load is drawn.

It is to be noted that in the foregoing example motor 42 is shown to include the four terminals requisite for various field and armature connections necessary for the above two voltage ranges. The second motor 41 may be similarly connected and in present use is tied in parallel with motor 42. The dual motor arrangement, however, is determined by considerations like redundancy and power to weight ratio and the operative features described herein are inherent with either motor configuration. Similarly the battery stack comprising six batteries is dictated by the present availability of 6 volt deep discharge batteries, other configurations being possible as the batteries are improved.

In each instance however, the battery state indicator, comprising switch 66 in series with meter 67, is connected to test only selected batteries, being connected across batteries $21_5$ and $21_6$ only, the series connection of the rest of the batteries indicating the battery state across the same segment. The capability of series stacking of batteries at no load further allows for convenient charging implementation, charger 25 and array 30 being connected across the full battery stack, i.e., across batteries $21_1$–$21_6$.

Obviously many modifications and variations to the above disclosure can be made without departing from the spirit of the invention. It is therefore intended that the scope of the invention be determined solely dependent on the claims hereto.

What is claimed is:

1. In a gas driven automobile including an internal combustion engine having associated therewith gearing and a first differential, said engine gearing and differential being disposed proximate a first axle connected to be driven thereby, said automobile further including a second axle, the improvement comprising:
    a second differential connected to said second axle for distributing power thereto, said second differential including an input shaft for receiving power applied thereto and sprocket means mounted on said input shaft;
    electric motor means attached to said second axle including chain drive means connected to said sprocket means;
    a first and second array of batteries disposed within said automobile each said array comprising a series connection of a plurality of batteries;
    control means connected between said arrays and said electric motor means including a first, manually selected, control stage for connecting said first and second arrays to said motor means in series or in parallel according to the manual selection thereof and a second control stage articulated by a foot pedal for interposing combinations of current limiting resistors between said first stage and said motor means according to the position of said foot pedal; and
    solar panel means disposed on said automobile and connected across said first and second array for recharging said batteries when said first control stage is in said series connecting mode.

2. Apparatus according to claim 1 wherein:
    said electric motor means is disposed for thermal communication with said first and second array.

3. Apparatus according to claim 2 wherein:
    said control means further includes a third, manually selected, control stage for reversing the connection from said first stage to said motor means.

4. Apparatus according to claim 3 further comprising:
    an electric charger adapted for connection to a source of A.C. power connected in parallel with solar panel means.

5. Apparatus according to claim 1 wherein:
    said second control stage includes a multiposition switch including a conductive bar pivotally articulated by said foot pedal, said switch having a first electrically excited terminal disposed for contact by one end of said bar when the other end thereof is in contact with a second and third terminal.

* * * * *